Figure 1:
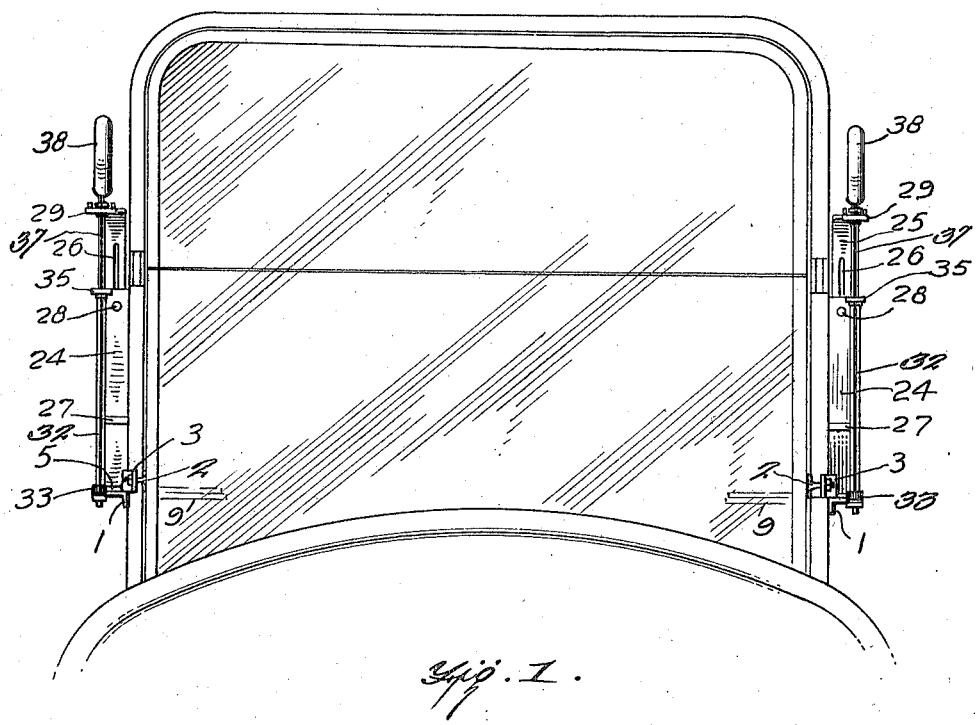

S. T. KING.
TRAFFIC SIGNAL.
APPLICATION FILED APR. 17, 1920.

1,393,381. Patented Oct. 11, 1921.
2 SHEETS—SHEET 1.

Inventor
S. T. KING,
By Watson E. Coleman
Attorney

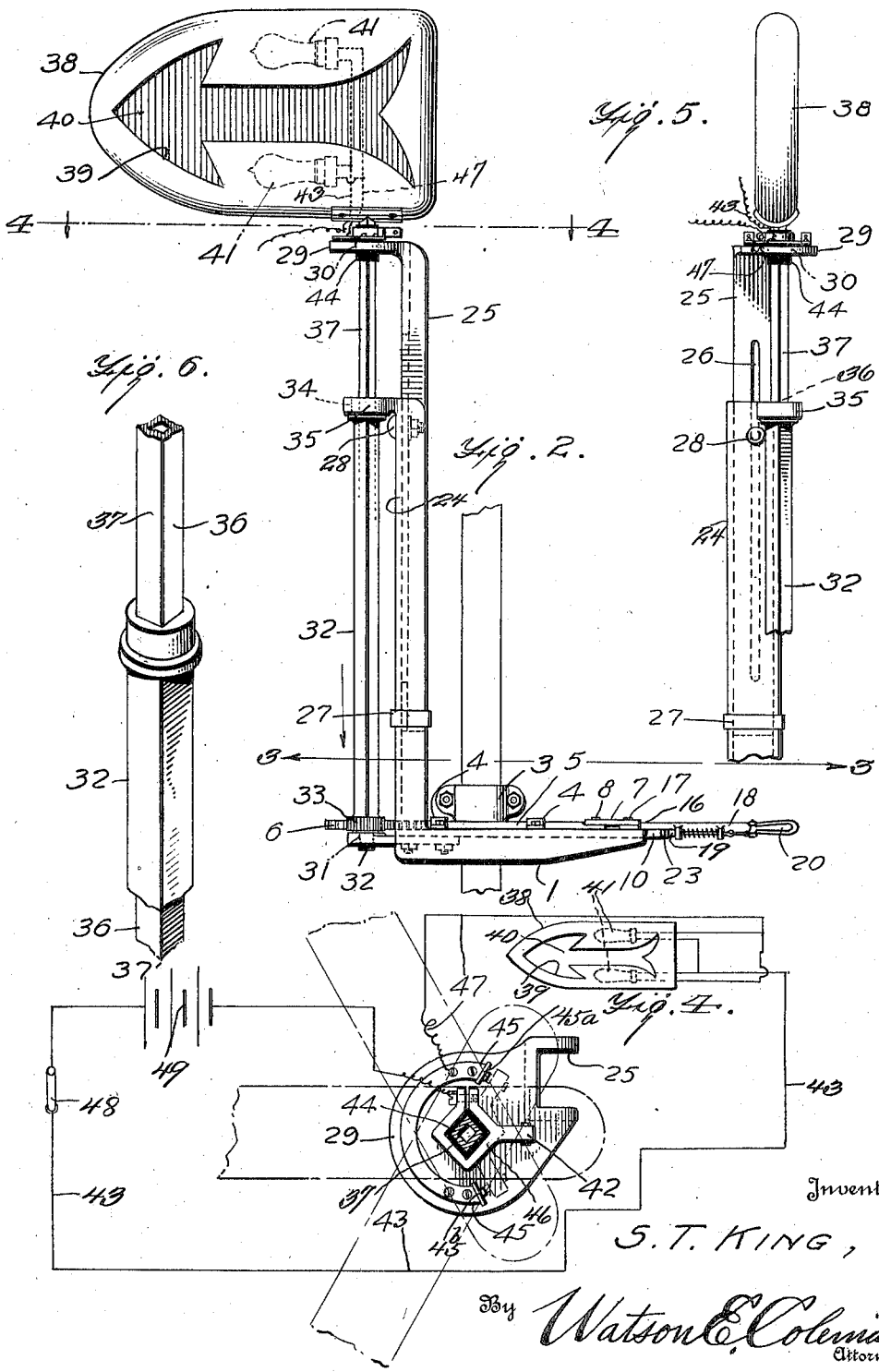

UNITED STATES PATENT OFFICE.

SAM T. KING, OF WILLIAMSFIELD, ILLINOIS.

TRAFFIC-SIGNAL.

1,393,381.

Specification of Letters Patent.

Patented Oct. 11, 1921.

Application filed April 17, 1920. Serial No. 374,679.

*To all whom it may concern:*

Be it known that I, SAM T. KING, a citizen of the United States, residing at Williamsfield, in the county of Knox and State of Illinois, have invented certain new and useful Improvements in Traffic-Signals, of which the following is a specification, reference being had to the accompanying drawings.

This invention relates to an improved traffic signal for automobiles and it has for its object to provide a device of this kind, which is simple, efficient and practical in construction, capable of being cheaply made, easily applied to motor driven vehicles and the like, more especially to the wind shield thereof, and may be sold at a reasonable profit.

Another object is to provide a signal, capable of being applied to either side of the wind shield or one upon each side, preferably as shown in the drawings, in combination with means connected to the signal carrying shaft, operable from the inside of the automobile, whether the automobile is of the open or closed type, so as to indicate whether or not the chauffeur of the automobile intends to turn to the right or to the left.

A further object embodies the provision of means whereby the indicator or signal can be raised or lowered to different heights.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 3:
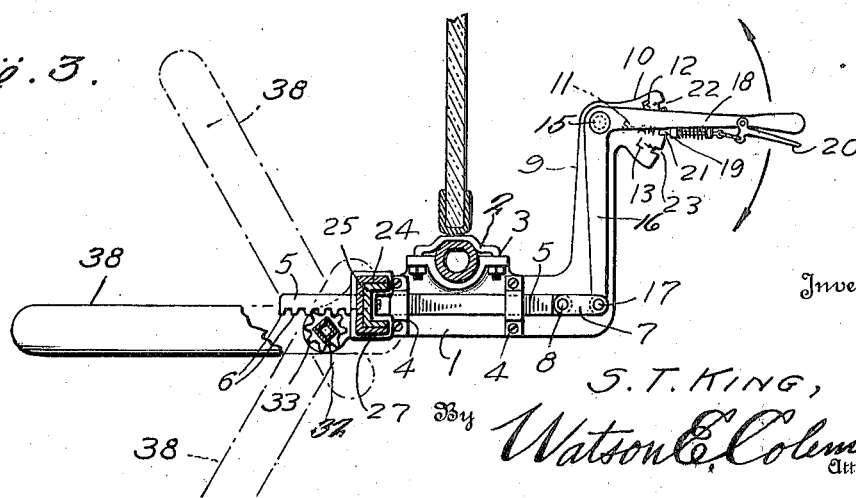

Figure 1 is a front view of the wind shield of an automobile illustrating the improved signal apparatus as applied, one to each side of the frame of the wind shield, Fig. 2 is an enlarged side elevation of the signal apparatus showing the novel features of the construction and the means for manipulating the signal, Fig. 3 is a sectional view on line 3—3 of Fig. 2 showing the operating means for the signal and the extensible section of the upright 24 showing the indicator or signal proper as being moved to the right and the left in dotted lines, Fig. 4 is a sectional view on line 4—4 of Fig. 2 showing diagrammatically the wiring of the lighting system for the indicator or signal, Fig. 5 is a front elevation of the upper part of the signal more clearly showing the upright 24, Fig. 6 is an enlarged detail view of the extensible shaft for the indicator.

Referring to the drawings, 1 designates a supporting bracket which is provided with an upright plate 3 which is arched to detachably connect to the side of the wind shield frame by means of the clamp 2. Mounted in guides 4, which are carried by the bracket 1 is a reciprocating bar 5 one end of which has rack teeth 6. A link 7 is connected at 8 to the other end of the reciprocating slide bar 5. The guides 4 are in the form of arched straps which are bolted or riveted in any suitable manner to the bracket 1. The inner part of the bracket 1 has a laterally extending arm 9 terminating in a segment plate 10.

This plate is provided with indications 11, 12 and 13, indicating straight ahead, right and left. This plate is also provided with rack teeth. Pivotally mounted at 15 on the arm 9 is an oscillating lever 16, one end of which is pivotally connected at 17 to the link 7. The other end of the lever 16 has a lever arm 18, which carries a dog 19 and a hand grip 20. The dog 19 is designed to coöperate with any one of the three teeth 21, 22 and 23 (which correspond with the indications 11, 12 and 13) so as to hold the lever 16 set in any one of the three different positions.

When the lever arm 18 is set to register with the indication 11, the signal or indicator will be set indicating travel straight ahead and if the lever arm 18 is set in registration with the indication 12, the signal or indicator will assume a position denoting travel to the right; and if the lever arm is set in registration with the indication 13 then the indicator or signal will assume a position denoting a turn or travel to the left.

Rising upwardly from the bracket 1 is an upright 24. A vertically adjustable upright member 25 (which is provided with a slot 26) is disposed adjacent the upright 24. A guide loop 27 which is carried by the vertically slidable upright 25 engages about the upright 24 to assist in guiding the sliding upright. A bolt 28 passes transversely through the upper part of the upright 24 and engages through the slot 26 and has a nut on one end for holding the upright 25 in a different adjusted position.

It will be noted that the signal 38 is ordinarily positioned a short distance below the upper edge of the windshield, therefore on crowded thoroughfares, the signal is not so easily visible above the heads of the pedestrians. Therefore, the purpose of providing a signal of this adjustable character, is to enable the same to be positioned a substantial distance above the upper edge of the windshield, hence permitting the signal to be easily seen, not only by the chauffeurs or drivers of other automobiles, but also permitting the signal to be seen by pedestrians, who are not so close to the automobile. Another reason for providing a signal of this adjustable character is that some makes of automobiles have windshields and tops lower than those of other automobiles. Also the bodies of some automobiles are suspended lower than others, and since the bracket of the signaling device is applied to the windshield of all makes of automobiles by the same means and in the same locality, the signaling member proper must necessarily be positioned a substantial distance above the windshield, or substantially even with the upper edge of the windshield, so that it may be easily seen, hence the adjustability of the upright 25. The upper end of the upright 25 has a forwardly extending arm 29 provided with a bearing 30. Mounted in a bearing 31 of the forward extremity of the bracket 1 is a shaft 32 having a gear 33 on one end, meshing with the rack teeth 6 of the reciprocating rack bar 5. The other end of the shaft 32 is mounted in a bearing 34 of a lateral arm 35 of the upper end of the upright 24. A greater portion of the shaft 32 is hollow and the inner portion thereof is rectangular in cross section so as to telescopically receive the rectangular end 36 of the shaft section 37, which in turn is rotatively mounted in the bearing 30 of the arm 29.

The upper end of this shaft section 37 which projects beyond the arm 29 carries the indicator 38. This indicator is constructed of any suitable material preferably metal or the like, and has both sides thereof cut away as indicated at 39 to conform to the shape of an arrow. These cut away portions or openings are covered with any suitable transparent material such as celluloid or the like 40, and mounted on the interior of the indicator are electric light bulbs 41.

A stationary contact 45 is carried by the upper face of the forwardly extending arm 29 and is insulated therefrom as shown. This stationary contact has upwardly extending contact arms 45$^a$ and 45$^b$. A rectangular collar 46 is clamped as shown to the upper end of the section 37 and is insulated therefrom by means of the insulation 44. This collar 46 has a laterally projecting contact arm 42 which is designed to engage with one of the contacts 45$^a$ and 45$^b$, it depending entirely upon the direction of rotation of the shaft. The electric light bulbs are electrically connected to the contact plate 45 by means of the lead or wire 47. The bulbs are also electrically connected by the lead or wire 43 to the switch 48 which in turn is electrically connected to the battery 49. It is not the aim to limit the invention to the particular system of lighting the bulbs for it is obvious that the bulbs may be in circuit with the usual electric battery system of the automobile without providing an entirely independent circuit. In so far as the invention is concerned it is immaterial as to how the current may be connected with the bulbs. When the rockable shaft is moved to swing the signal or indicator to the right, the contact arm 42 will engage the contact 45$^b$. In this case current will pass from the battery to the collar 46 over the arm 42 and the contact plate 45 over the lead or wire 47 to the lights of the indicator and then from the lights or bulbs over the wire 43 back to the battery. Should the rockable shaft be moved to swing the indicator or signal to the left, the contact arm 42 will engage the contact 45$^a$. In this case current will pass from the battery to the collar 46 and the arm 42 over the plate 45 to the bulbs by way of the lead or wire 47. From the bulbs the current will travel over the wire or lead 43 back to the battery. It will be noted that this signal apparatus may be very easily and quickly manipulated, and furthermore is very conveniently carried on the shield so that the indicator may be operated from the interior of the car.

In order to move the indicator to the right or left the lever 18 is manipulated which will impart movement to the reciprocating slide bar 5 which in turn will rock the tubular shaft 32. The shaft 32 will in turn rock the shaft section 37 and owing to the indicator being carried by the upper end of this shaft section the indicator will move to the right or the left. When moved to the right or the left, the arm 42 will coöperate with either one of the contact arms 45$^a$ and 45$^b$ thereby closing the electric circuit and causing the bulbs to light.

The invention having been set forth, what is claimed as new and useful is:—

1. In a traffic signal, a bracket adapted to be fixed to the wind shield frame of an automobile, an upright support, said support comprising fixed and sliding sections, a tubular shaft mounted in bearings of the fixed section, a shaft section mounted in bearings of the slidable section and carrying an indicator on its upper end and being telescopically united with the shaft of the fixed section, a slide bar mounted in guides of the bracket and being operatively connected with the first shaft, and means operatively connected with the slide bar, whereby the first shaft may be rocked in one direction or the other.

2. In a traffic signal, a bracket adapted to be fixed to the wind shield frame of an automobile, an upright support, said support comprising fixed and sliding sections, a tubular shaft mounted in bearings of the fixed section, a shaft section mounted in bearings of the slidable section and carrying an indicator on its upper end and being telescopically united with the shaft of the fixed section, a slide bar mounted in guides of the bracket and being operatively connected with the first shaft, and means operatively connected with the slide bar, whereby the first shaft may be rocked in one direction or the other, and means for holding the slidable section of the support in different adjusted positions.

3. In a traffic signal, a bracket connected to one side of an automobile windshield and provided with a laterally extending arm disposed to the rear of the windshield and terminating in a rearwardly extending segment, a revoluble shaft in bearings of said bracket and carrying a signal at its upper end, a gear on the lower end of said shaft, a slidable rack in bearings of the bracket and engaging said gear, a rightangle lever mounted upon the lateral arm and pivoted concentrically with the segment, one arm of said rightangle lever being operatively connected to the slidable rack, its other arm having means operatively connecting with the segment, for holding the signal in different adjusted positions.

4. In a traffic signal, a bracket secured to one side of an automobile windshield, said bracket having a lateral arm terminating in a segment, an angle lever pivoted to the arm and having one arm movable radially relatively to the segment, a shaft rockable in bearings of the bracket, a slide bar operatively connected to the other arm of the lever and movable in bearings of the bracket, operative connections between the slide bar and the shaft, whereby upon operating the angle lever in one direction or the other, the signal will correspondingly move.

5. In a traffic signal, a bracket secured to one side of an automobile windshield, said bracket having a lateral arm terminating in a segment, an angle lever pivoted to the arm and having one arm movable radially relatively to the segment, a shaft rockable in bearings of the bracket, a slide bar operatively connected to the other arm of the lever and movable in bearings of the bracket, operative connections between the slide bar and the shaft, whereby upon operating the angle lever in one direction or the other, the signal will correspondingly move, said bracket comprising a fixed section, and a telescopically movable section, said sections being angular in cross-section, and means for holding the movable section in different adjusted positions relatively to the fixed section, whereby the signal may be adjusted relatively to the height of the automobile and the windshield thereof.

6. In a traffic signal, a bracket section comprising an upright channeled portion connected to and parallel with the side bar of a windshield and a horizontal portion, said horizontal portion having a lateral arm terminating in a rightangle disposed segment; a second channeled bracket section engaged with the upright channeled portion, a guide strap carried by the second channeled section and engaging the upright channeled portion, a slot and bolt connection between the second channeled portion for holding the former in different adjusted positions, a shaft rockable in bearings of the two bracket sections and comprising two adjustable parts, one of said parts carrying the signal, a gear on the other part, a slide rack bar in bearings of the horizontal portion of one of the bracket sections and engaging the gear of said shaft, a rightangle lever pivoted concentrically with the segment and having one arm operatively connected to the slide bar, and means carried by the other arm of the rightangle lever for coöperatively engaging with the segment to hold the lever in different adjusted positions, for holding the signal to the left or the right, or in the center of the road and straight ahead.

In testimony whereof I hereunto affix my signature.

SAM T. KING.